3,463,998
OVERVOLTAGE CONTROL
Forest D. Smith and Derrick N. Alcock, Minneapolis, Minn., assignors to Electric Machinery Mfg. Company, Minneapolis, Minn., a corporation of Minnesota
Filed Dec. 27, 1966, Ser. No. 604,775
Int. Cl. H02h 7/06
U.S. Cl. 322—28                8 Claims

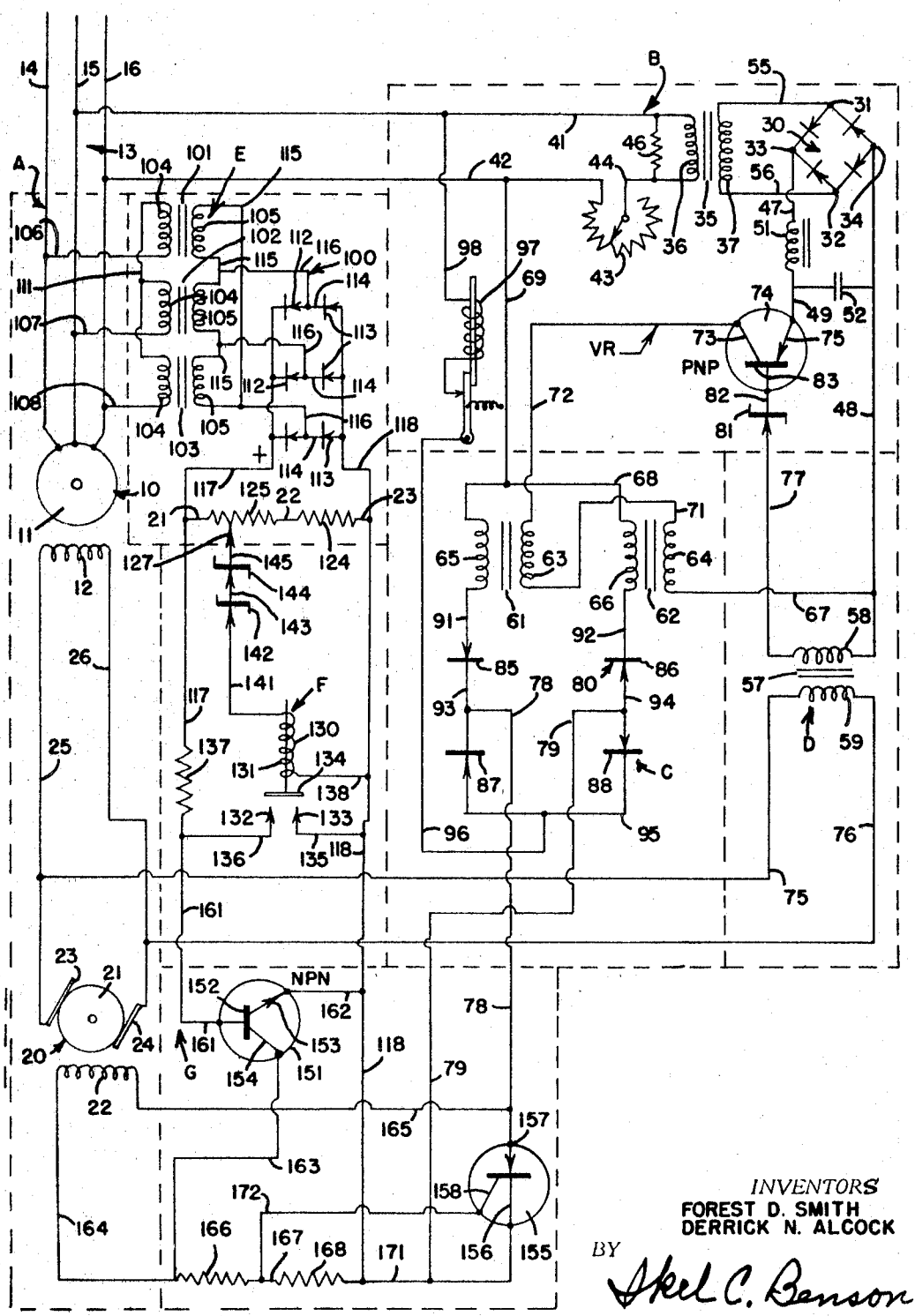

ABSTRACT OF THE DISCLOSURE

An overvoltage control for use with an alternating-current electric power supply including a generator having a field winding energized by a direct current exciter, also having a field winding, a conventional voltage regulator, supplying direct current of regulated voltage to said exciter field winding, said control having a sensing circuit sensitive to the voltage of the power supply and upon over voltage thereof operating a detecting circuit including a sensitive relay. This relay operates a switch means normally shunting resistive means in the exciter field winding circuit. Actuation of said relay opens said switch means to insert the resistive means in the circuit and to trigger locking means shorting the exciter field winding and the voltage regulator.

---

The drawing is a wiring diagram of a conventional alternating-current power supply with an overvoltage control constituting an embodiment of the invention associated therewith.

The power supply is indicated in its entirety by the reference character A. The voltage of the output of the power supply is regulated by a voltage regulator VR which includes a voltage sensing circuit B, a magnetic amplifier C, and a stabilizing circuit D. The invention includes a sensing circuit E subject to the output voltage of the power supply A and which operates a detecting circuit F. The circuit F actuates a trigger circuit G and which shorts out the magnetic amplifier and the exciter field and renders the power supply inoperative.

The power supply a comprises a three-phase alternating-current generator 10 having a rotor 11 and a field winding 12. The rotor 11 is connected to an outlet line 13 having three conductors 14, 15 and 16. The field winding 12 is energized by means of an exciter 20 having an armature 21 and a field winding 22. Brushes 23 and 24 contact the commutator of the exciter and have connected to them conductors 25 and 26 which are connected to the field winding 12 of generator 10.

The sensing circuit B of the voltage regulator VR comprises a full wave rectifier 30 which has two input terminals 31 and 32 and two output terminals 33 and 34. A transformer 35 energizes the rectifier and has a primary 36 and a secondary 37. One end of the primary 36 is connected by means of a conductor 41 to the conductor 15 of line 13. Conductor 16 of said line has connected to it a conductor 42 which is connected to one end of a resistor or rheostat 43. The movable arm of the resistor 43 is connected by means of a conductor 44 to the other end of the primary 36. A fixed resistor 46 is connected across the conductors 41 and 44. The secondary 37 of transformer 35 is connected by means of conductors 55 and 56 to the input terminals 31 and 32 of rectifier 30. The output terminals 33 and 34 of rectifier 30 have connected to them conductors 47 and 48. Conductor 47 is connected to a choke 51 at one end thereof while a conductor 49 is connected to the choke 51 at the other end thereof. A condenser 52 is connected across the conductors 48 and 49 and together with the choke 51 serves to filter the rectified alternating current and to deliver to the conductors 48 and 49 substantially-pure direct current.

The sensing circuit B of the voltage regulator VR further includes a transistor 74 having a base 83, an emitter 75 and a collector 73. The conductor 49 is connected to the emitter 75 while the base 83 has connected to it a conductor 82 which in turn is connected to a Zener diode 81. This diode has connected to it a conductor 77.

The stabilizing circuit D includes a stabilizing transformer 57 having a primary 58 and a secondary 59. The primary 58 is connected to the conductors 77 and 48. The secondary 59 has two conductors 75 and 76 connected to it and which are connected to the conductors 25 and 26 from the exciter 20.

The magnetic amplifier C consists of two saturable-core reactors 61 and 62 having primaries 63 and 64 and secondaries 65 and 66. The primary 64 of reactor 62 is connected by a conductor 67 to the conductor 48. Said primary is further connected by means of a conductor 71 to the primary 63. This primary is further connected by means of a conductor 72 to the collector 73 of the transistor 74. The secondary 66 of reactor 62 is connected to the secondary 65 of reactor 61 by means of a conductor 68 which is connected by means of a conductor 69 to conductor 42.

The magnetic amplifier B further includes a full wave rectifier 80 utilizing four diodes 85, 86, 87 and 88. Diodes 85 and 86 are connected by means of conductors 91 and 92 to the secondaries 65 and 66 of the reactors 61 and 62. The diodes 85 and 87 and the diodes 86 and 88 are connected together by means of conductors 93 and 94 and the diodes 87 and 88 are connected together by means of a conductor 95. This conductor is connected to another conductor 96 which in turn is connected to an overcurrent relay 97 which in turn is connected by a conductor 98 to conductor 41. The output of magnetic amplifier C is taken from the same through two conductors 78 and 79 which are connected to the conductors 93 and 94 of the rectifier respectively.

The sensing circuit E includes a three-phase rectifier 100 which comprises three transformers 101, 102 and 103 each having a primary 104 and a secondary 105. The primaries 104 are each connected across one phase of the power supply by means of conductors 106, 107 and 108. The primaries are further connected together by means of a conductor 111. In conjunction with the transformers 101, 102 and 103 pairs of diodes 112 and 113 are employed, the diodes of each pair being conducted in series by means of conductors 114. The secondaries 105 of the transformers 101, 102 and 103 are connected in series by means of conductors 115. The conductors 114 are connected by means of conductors 116 to the conductors 115. Each pair of diodes is connected to two output conductors 117 and 118. Across these conductors are connected by means of conductors 21, 22 and 23 a fixed resistor 124 and a potentiometer 125 which are connected in series to form a voltage divider for providing proper voltage for operating the detecting circuit F.

The detecting circuit F includes a sensitive relay 130 which has a coil 131, two fixed contacts 132 and 133 and a movable contact 134 adapted to close the circuit through contacts 132 and 133. Contact 133 is connected by means of a conductor 135 to conductor 118. Contact 132 is connected by means of a conductor 136 to a resistor 137 which in turn is connected to conductor 117. One end of the coil 131 of relay 130 is connected by means of a conductor 138 to the conductor 118. The other end of this coil is connected by a conductor 141 to a Zener diode 142 which in turn is connected by a conductor 143 to another Zener diode 144. Diode 144 is connected by means of a conductor 145 to the movable contact 127 of the variable resistor 125.

The triggering circuit G includes a transistor 151 having a base 152, an emitter 153 and a collector 154. This circuit also includes a silicon controlled rectifier 155 having an anode 157, a cathode 156 and a gate 158. The base 152 of the transistor 151 is connected by a conductor 161 to conductor 136. The emitter 153 is connected by means of a conductor 162 to conductor 118 and the collector 154 is connected by means of a conductor 163 to a conductor 164 which in turn is connected to one end of the field winding 22 of exciter 20. The other end of this field winding is connected by means of a conductor 165 to the conductor 78. The conductor 164 is connected to a resistor 166 which is connected by means of a conductor 167 to another resistor 168 which is connected by means of a conductor 171 to the conductors 118 and 79 and to the cathode 156 of silicon controlled rectifier 155. Conductor 78 is connected to the anode 157 of silicon controlled rectifier 155.

The operation of the power supply A, and the voltage regulator VR including the sensing circuit B, the magnetic amplifier C and the stabilizer circuit D is conventional and will not be described. If however the voltage regulator does not operate or the voltage at the supply line 13 increases in any of its phases above a predetermined value the increase in voltage in any and all of the phases of the line 13 is reflected through the transformers 101, 102 and 103 the rectifiers 112, and 113 to the sensing circuit E. Here the voltage of each phase is transformed to a desired voltage and rectified to produce a single direct current composite voltage. This voltage is impressed across a voltage divider comprising resistors 124 and 125 where the proper signal voltage for the operation of the invention may be procured.

The detecting circuit F utilizes the two Zener diodes 143 and 144 to procure a reference voltage. These diodes when the voltage is at or below normal do not conduct but when an over voltage occurs they conduct and energize the coil 131 of relay 130. This closes the switch comprising contacts 132, 133 and 134 and completes the circuit through conductors 161 and 118.

In the trigger circuit G the transistor 151 serves as switch means shunting the two resistors 166 and 168, through the shunting circuit comprising conductors 163, 162 and 118. The circuit comprising contacts 132, 133 and 134, the conductors 135, 136, 161, 118 and 162 and the base and emitter 152 and 162 of transistor 151 constitute a switching circuit for operating the switching means, namely the transistor 151. The transistor 151 being an NPN transistor, current flows through the emitter-collector circuit shunting resistors 166 and 167 thus forming a free path for the current to flow from the voltage regulator VR to the exciter field winding 22. As soon as the circuit through the switching circuit is cut off by relay 130 no current flows in the emitter-collector circuit with the result that the shunt across resistors 166 and 167 is removed. The current from the voltage regulator then flows through said resistors. This produces a voltage on gate 158 of silicon controlled rectifier 155. When the voltage on gate 158 is high enough the silicon controlled rectifier 155 fires and the circuits including conductors 78 and 79 and the conductors 164 and 165 are bridged, thus shorting out both the exciter field winding 22 and the voltage regulator VR. Resistor 166 is of a high value causing the voltage on winding 22 to decay rapidly. Excessive current flows through the circuit including conductors 69, 96 and 98 causing the overcurrent relay 97 to open and disconnect the voltage regulator from the line 13 thus rendering generator 10 inoperative.

The advantages of the invention are manifest. Over voltage not compensated for by the voltage regulator or due to malfunctioning of the voltage regulator quickly shuts off the power thereby protecting delicate apparatus operated thereby from injury. The invention is simple in construction requiring no special parts and is easily maintained in operating condition. By making the resistor 166 of high resistance rapid decay of current occurs in field winding 22 and a minimum period of over voltage occurs.

Changes in the specific form of the invention may be made within the scope of what is claimed without departing from the spirit of the invention.

Having described the invention what is claimed as new and desired to be protected by Letters Patent is:

1. In an alternating-current power supply having output means, a field-winding circuit and voltage regulator for delivering current of regulated voltage to said field-winding circuit, the combination of:
   (a) an overvoltage-sensing circuit connected to said output means and producing a direct voltage corresponding with the alternating voltage at said output means,
   (b) a detecting circuit energized by the voltage of said sensing circuit and including
   (c) a normally open relay,
   (d) means for actuating said relay when the voltage of said sensing circuit exceeds a predetermined value
   (e) a triggering circuit including,
   (f) resistive means connected to the field-winding circuit,
   (g) a shunting circuit shunting said resistive means,
   (h) switch means normally closing said shunting circuit to shunt said resistive means,
   (i) a switching circuit operated by said relay to open the switch means and insert the resistive means in said field winding circuit and
   (j) locking means operated upon actuation of said switch means shorting the output of said voltage regulator to said field-winding circuit.

2. The combination according to claim 1 in which the means for actuating the relay comprises
   (a) a Zener diode providing a reference voltage and blocking the flow of current by the relay when the voltage is at normal or below.

3. The combination according to claim 1 in which the switch means is
   (a) a transistor normally closing the shunting circuit to shunt the resistive means 4. The combination according to claim 2 in which the transistor is
   (a) an NPN transistor.

5. The combination in accordance with claim 4 in which
   (a) the shunting circuit includes the collector and emitter of the transistor and
   (b) the release circuit includes the emitter and base of the transistor.

6. The combination according to claim 1 in which the locking means is
   (a) a silicon controlled rectifier.

7. The combination according to claim 6 in which
(a) the anode-cathode elements of the silicon controlled rectifier are connected in the output circuit of the voltage regulator and
(b) the gate of the silicon controlled rectifier is connected to the resistive means and is subject to the voltage thereof.

8. The combination in accordance with claim 1 in which
(a) the alternating-current power supply has a rotary exciter having a field-winding circuit and
(b) the resistive means is connected in the field-winding circuit of the exciter.

References Cited

UNITED STATES PATENTS

| 2,677,076 | 4/1954 | James | 317—31 X |
| 2,735,039 | 2/1956 | Schuh | 317—20 X |

ORIS L. RADER, Primary Examiner

H. HUBERFELD, Assistant Examiner

U.S. Cl. X.R

317—13, 20, 31; 322—36, 73, 83